(12) United States Patent
Hancu et al.

(10) Patent No.: US 7,501,753 B2
(45) Date of Patent: Mar. 10, 2009

(54) PHOSPHOR AND BLENDS THEREOF FOR USE IN LEDS

(75) Inventors: Dan Hancu, Clifton Park, NY (US); Mukunda Adyam, Karnataka (IN); Emil Radkov, Euclid, OH (US); Prasanth Kumar, Karnataka (IN); Anant Achyut Setlur, Niskayuna, NY (US); Alok Mani Srivastava, Niskayuna, NY (US); Holly Ann Comanzo, Niskayuna, NY (US); Gopi Chandran, Karnataka (IN); Madras Venugopal Shankar, Karnataka (IN)

(73) Assignee: Lumination LLC, Valley View, OH (US)

( * ) Notice: Subject to any disclaimer, the term of this patent is extended or adjusted under 35 U.S.C. 154(b) by 417 days.

(21) Appl. No.: 11/216,566

(22) Filed: Aug. 31, 2005

(65) Prior Publication Data

US 2007/0045650 A1    Mar. 1, 2007

(51) Int. Cl.
*H01L 33/00* (2006.01)
(52) U.S. Cl. ............... 313/503; 313/505; 313/506; 313/512; 252/301.4; 252/301.6
(58) Field of Classification Search ......... 313/495–512; 252/301.4 F, 301.6 F, 301.4 H, 301.4 R; 428/690
See application file for complete search history.

(56) References Cited

U.S. PATENT DOCUMENTS 3,676,361 A * 7/1972 Datta ............... 252/301.4 F

2003/0067008 A1 * 4/2003 Srivastava et al. ......... 257/79
2003/0227007 A1 * 12/2003 Ezuhara et al. ......... 252/500
2004/0007961 A1 * 1/2004 Srivastava et al. ........ 313/486

FOREIGN PATENT DOCUMENTS

| DE | 20 28 376 A1 | 12/1970 |
|---|---|---|
| DE | 102 59 946 A1 | 7/2004 |
| GB | 544160 | 3/1942 |
| WO | WO 99-45558 * | 9/1999 |
| WO | WO 2005/027231 A1 | 3/2005 |
| WO | WO 2005-027231 A1 * | 3/2005 |
| WO | WO 2005/044947 A2 | 5/2005 |
| WO | WO 2005/061659 A1 | 7/2005 |

* cited by examiner

*Primary Examiner*—Joseph L Williams
*Assistant Examiner*—Elmito Breval
(74) *Attorney, Agent, or Firm*—Fay Sharpe LLP

(57) ABSTRACT

Phosphor compositions having the formula $Eu_eM_mA_aG_gQ_qN_nX_x$, where M is at least one of Be, Mg, Ca, Sr, Ba, Cd, Sn, Pb or Zn; A is at least one of B, Al, Ga, In, Bi, Sc, Y, La or a rare earth element other than Eu; G is at least one of Si or Ge; Q is at least one of O, S, and Se; X is at least one of F, Cl, Br and I; $0<e<2$, $0<m<2$, $0\leq a<1$, $0<g<1$, $0<q<4$, $0\leq n<2$, $0\leq x<2$, and $2e+2m+3a+4g=2q+3n+x$; and light emitting devices including a light source and the above phosphor. Also disclosed are blends of $Eu_eM_mA_aG_gQ_qN_nX_x$ and one or more additional phosphors and light emitting devices incorporating the same.

24 Claims, 5 Drawing Sheets

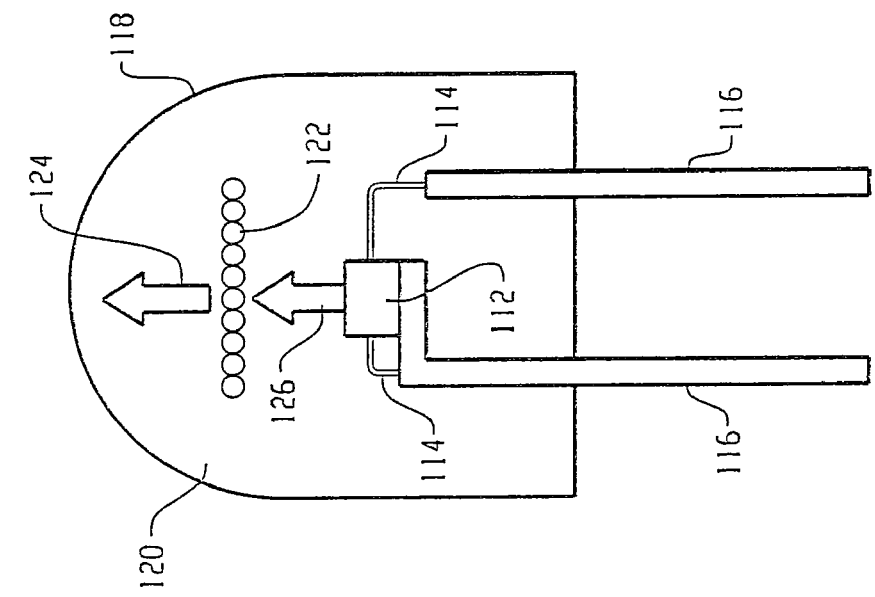
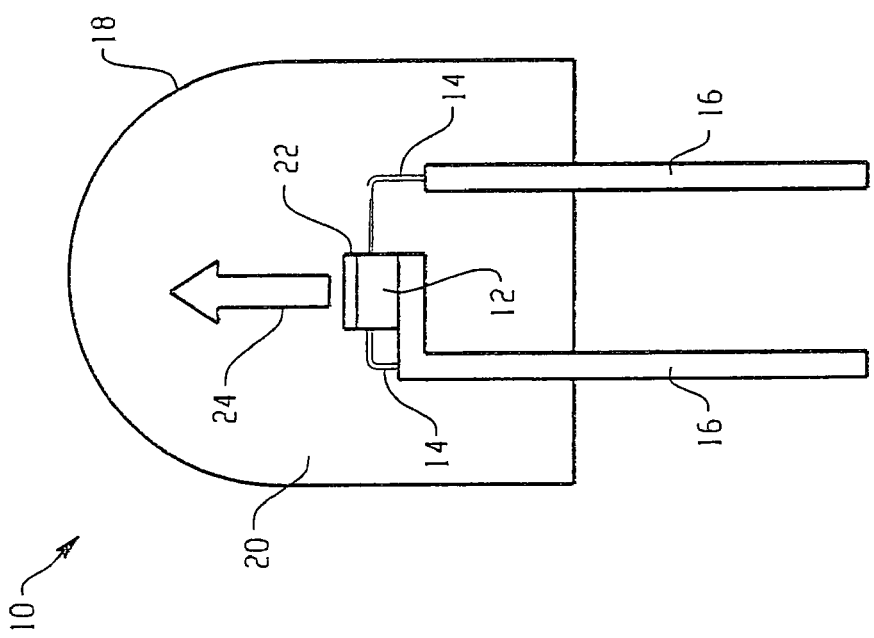
Fig. 2
Fig. 1

PHOSPHOR AND BLENDS THEREOF FOR USE IN LEDS

BACKGROUND OF THE INVENTION

The present exemplary embodiments relate to novel phosphor compositions. They find particular application in conjunction with converting LED-generated ultraviolet (UV), violet or blue radiation into white light or other colored light for general illumination purposes. It should be appreciated, however, that the invention is also applicable to the conversion of radiation in Hg-based fluorescent lamps, as scintillating detector elements in computed tomography (CT) and positron emission tomography (PET), UV, violet and/or blue lasers, as well as other white or colored light sources for different applications.

Light emitting diodes (LEDs) are semiconductor light emitters often used as a replacement for other light sources, such as incandescent lamps. They are particularly useful as display lights, warning lights and indicating lights or in other applications where colored light is desired. The color of light produced by an LED is dependent on the type of semiconductor material used in its manufacture.

Colored semiconductor light emitting devices, including light emitting diodes and lasers (both are generally referred to herein as LEDs), have been produced from Group III-V alloys such as gallium nitride (GaN). To form the LEDs, layers of the alloys are typically deposited epitaxially on a substrate, such as silicon carbide or sapphire, and may be doped with a variety of n and p type dopants to improve properties' such as light emission efficiency. With reference to the GaN-based LEDs, light is generally emitted in the UV and/or blue range of the electromagnetic spectrum. Until quite recently, LEDs have not been suitable for lighting uses where a bright white light is needed, due to the inherent color of the light produced by the LED.

Recently, techniques have been developed for converting the light emitted from LEDs to useful light for illumination purposes. In one technique, the LED is coated or covered with a phosphor layer. A phosphor is a luminescent material that absorbs radiation energy in a portion of the electromagnetic spectrum and emits energy in another portion of the electromagnetic spectrum. Phosphors of one important class are crystalline inorganic compounds of very high chemical purity and of controlled composition to which small quantities of other elements (called "activators") have been added to convert them into efficient fluorescent materials. With the right combination of activators and host inorganic compounds, the color of the emission can be controlled. Most useful and well-known phosphors emit radiation in the visible portion of the electromagnetic spectrum in response to excitation by electromagnetic radiation outside the visible range.

By interposing a phosphor excited by the radiation generated by the LED, light of a different wavelength, e.g., in the visible range of the spectrum, may be generated. Colored LEDs are often used in toys, indicator lights and other devices. Manufacturers are continuously looking for new colored phosphors for use in such LEDs to produce custom colors and higher luminosity.

In addition to colored LEDs, a combination of LED generated light and phosphor generated light may be used to produce white light. The most popular white LEDs are based on blue emitting GaInN chips. The blue emitting chips are coated with a phosphor that converts some of the blue radiation to a complementary color, e.g. a yellow-green emission. The total of the light from the phosphor and the LED chip provides a color point with corresponding color coordinates (x and y) and correlated color temperature (CCT), and its spectral distribution provides a color rendering capability, measured by the color rendering index (CRI).

The CRI is commonly defined as a mean value for 8 standard color samples ($R_{1-8}$), usually referred to as the General Color Rendering Index and abbreviated as $R_a$, although 14 standard color samples are specified internationally and one can calculate a broader CRI ($R_{1-14}$) as their mean value. In particular, the $R_9$ value, measuring the color rendering for the strong red, is very important for a range of applications, especially of medical nature.

One known white light emitting device comprises a blue light-emitting LED having a peak emission wavelength in the blue range (from about 440 nm to about 480 nm) combined with a phosphor, such as cerium doped yttrium aluminum garnet $Y_3Al_5O_{12}:Ce^{3+}$ ("YAG"). The phosphor absorbs a portion of the radiation emitted from the LED and converts the absorbed radiation to a yellow-green light. The remainder of the blue light emitted by the LED is transmitted through the phosphor and is mixed with the yellow light emitted by the phosphor. A viewer perceives the mixture of blue and yellow light as a white light.

The blue LED-YAG phosphor device described above typically produces a white light with a general CRI ($R_a$) of from about 70-82 with a tunable color temperature range of from about 4500K to 8000K. Recent commercially available LEDs using a blend of YAG phosphor and a red phosphor (CaS:$Eu^{2+}$) provide color temperatures below 4500K with a $R_a$ around 90. While such LEDs are suitable for some applications, many users desire a light source with an even higher $R_a$, one similar to that of incandescent lamps with a value of 95-100.

Another phosphor that has shown promise in lighting applications is $(Ca,Ba,Sr)_2SiO_4$:Eu. While providing suitable characteristics for many lighting applications, further flexibility in emission color as well as higher quantum efficiency, higher color rendering index (CRI) values and lower color correlated temperature (CCT) is desired.

In addition, due to their increasing use, there is a continued demand for additional phosphor compositions that can be used in the manufacture of both white and colored LEDs as well as in other applications, such as the conversion of radiation in Hg-based and metal halide discharge lamps, as scintillating detector elements in computed tomography (CT) and positron emission tomography (PET), UV, violet and/or blue lasers, as well as other white or colored light sources for different applications. Such phosphor compositions will allow an even wider array of LEDs with desirable properties.

BRIEF DESCRIPTION

In a first aspect, there is provided a phosphor composition $Eu_eM_mA_aG_gQ_qN_nX_x$, where M is at least one of Be, Mg, Ca, Sr, Ba, Cd, Sn, Pb or Zn; A is at least one of B, Al, Ga, In, Bi, Sc, Y, La or a rare earth element other than Eu; G is at least one of Si or Ge; Q is at least one of O, S, and Se; X is at least one of F, Cl, Br and I; $0<e<2$, $0<m<2$, $0\leq a<1$, $0<g<1$, $0<q<4$, $0\leq n<2$, $0\leq x<2$, and $2e+2m+3a+4g=2q+3n+x$.

In a second aspect, there is provided a phosphor blend comprising a first phosphor $Eu_eM_mA_aG_gQ_qN_nX_x$, where M is at least one of Be, Mg, Ca, Sr, Ba, Cd, Sn, Pb or Zn; A is at least one of B, Al, Ga, In, Bi, Sc, Y, La or a rare earth element other than Eu; G is at least one of Si or Ge; Q is at least one of O, S, and Se; X is at least one of F, Cl, Br and I; $0<e<2$, $0<m<2$, $0\leq a<1$, $0<g<1$, $0<q<4$, $0\leq n<2$, $0\leq x<2$, and $2e+2m+3a+4g=2q+3n+x$; and at least one additional phosphor.

In a third aspect, there is provided a white light emitting device including a light source emitting at from about 200 to about 500 nm and a phosphor composition $Eu_eM_mA_aG_gQ_qN_nX_x$, where M is at least one of Be, Mg, Ca, Sr, Ba, Cd, Sn, Pb or Zn; A is at least one of B, Al, Ga, In, Bi, Sc, Y, La or a rare earth element other than Eu; G is at least one of Si or Ge; Q is at least one of O, S, and Se; X is at least one of F, Cl, Br and I; $0<e<2$, $0<m<2$, $0\leq a<1$, $0<g<1$, $0<q<4$, $0\leq n<2$, $0\leq x<2$, and $2e+2m+3a+4g=2q+3n+x$.

BRIEF DESCRIPTION OF THE DRAWINGS

FIG. 1 is a schematic cross-sectional view of an illumination system in accordance with one embodiment of the present invention.

FIG. 2 is a schematic cross-sectional view of an illumination system in accordance with a second embodiment of the present invention.

DETAILED DESCRIPTION

Figure 4:
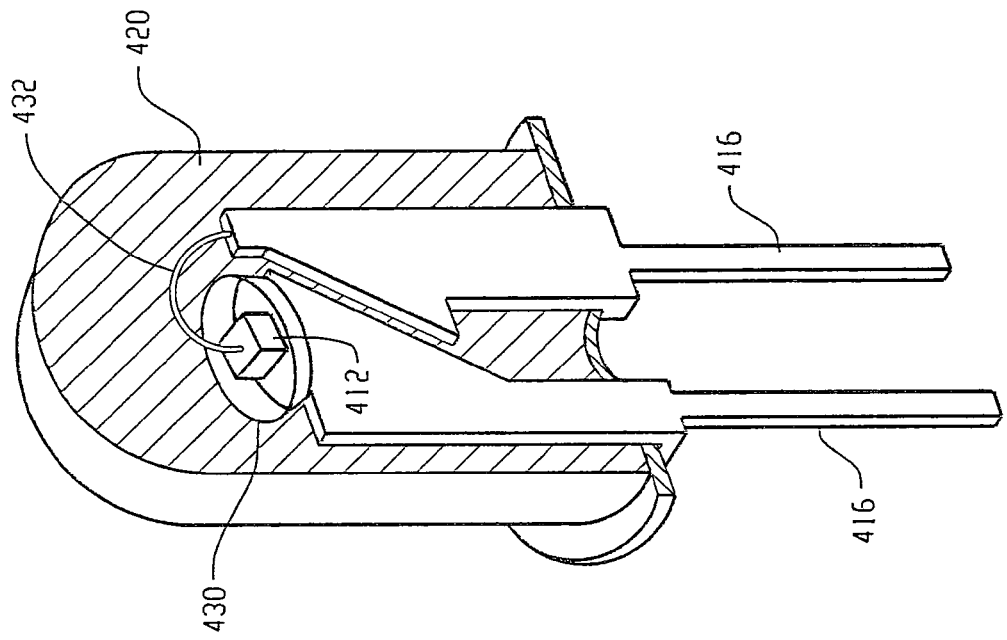
FIG. 4 is a cutaway side perspective view of an illumination system in accordance with a fourth embodiment of the present invention.

Phosphors convert radiation (energy) to visible light. Different combinations of phosphors provide different colored light emissions. The colored light that originates from the phosphors provides a color point. Novel phosphor compositions are presented herein as well as their use in LED and other light sources.

The color of the generated visible light is dependent on the particular components of the phosphor material. The phosphor material may include only a single phosphor composition or two or more phosphors of basic color, for example a particular mix with one or more of a yellow and red phosphor to emit a desired color (tint) of light. As used herein, the terms "phosphor" and "phosphor material" may be used to denote both a single phosphor composition as well as a blend of two or more phosphor compositions.

It was determined that an LED lamp that produces a white or colored light would be useful to impart desirable qualities to LEDs as light sources. Therefore, in one embodiment of the invention, a phosphor coated LED chip is disclosed for providing white or colored light. The visible light provided by the phosphor material (and LED chip if emitting visible light) comprises a bright white or colored light with high intensity and brightness.

With reference to FIG. 1, an exemplary LED based light emitting assembly or lamp 10 is shown in accordance with one preferred structure of the present invention. The light emitting assembly 10 comprises a semiconductor UV or visible radiation source, such as a light emitting diode (LED) chip 12 and leads 14 electrically attached to the LED chip. The leads 14 may comprise thin wires supported by a thicker lead frame(s) 16 or the leads may comprise self supported electrodes and the lead frame may be omitted. The leads 14 provide current to the LED chip 12 and thus cause the LED chip 12 to emit radiation.

The lamp may include any semiconductor visible or UV light source that is capable of producing white light when its emitted radiation is directed onto the phosphor. The preferred peak emission of the LED chip in the present invention will depend on the identity of the phosphors in the disclosed embodiments and may range from, e.g., 200-500 nm. In one preferred embodiment, however, the emission of the LED will be in the near UV to deep blue region and have a peak wavelength in the range from about 350 to about 430 nm. Typically then, the semiconductor light source comprises an LED doped with various impurities. Thus, the LED may comprise a semiconductor diode based on any suitable III-V, II-VI or IV-IV semiconductor layers and having an emission wavelength of about 250 to 550 nm.

Preferably, the LED may contain at least one semiconductor layer comprising GaN, ZnO or SiC. For example, the LED may comprise a nitride compound semiconductor represented by the formula $In_iGa_jAl_kN$ (where $0\leq i$; $0\leq j$; $0\leq k$ and $i+j+k=1$) having a peak emission wavelength greater than about 200 nm and less than about 500 nm. Such LED semiconductors are known in the art. The radiation source is described herein as an LED for convenience. However, as used herein, the term is meant to encompass all semiconductor radiation sources including, e.g., semiconductor laser diodes.

Although the general discussion of the exemplary structures of the invention discussed herein are directed toward inorganic LED based light sources, it should be understood that the LED chip may be replaced by an organic light emissive structure or other radiation source unless otherwise noted and that any reference to LED chip or semiconductor is merely representative of any appropriate radiation source.

The LED chip 12 may be encapsulated within a shell 18, which encloses the LED chip and an encapsulant material 20. The shell 18 may be, for example, glass or plastic. Preferably, the LED 12 is substantially centered in the encapsulant 20. The encapsulant 20 is preferably an epoxy, plastic, low temperature glass, polymer, thermoplastic, thermoset material, resin or other type of LED encapsulating material as is known in the art. Optionally, the encapsulant 20 is a spin-on glass or some other high index of refraction material. In one embodiment, the encapsulant material 20 is a polymer material, such as epoxy, silicone, or silicone epoxy, although other organic or inorganic encapsulants may be used. Both the shell 18 and the encapsulant 20 are preferably transparent or substantially, optically transmissive with respect to the wavelength of light produced by the LED chip 12 and a phosphor material 22 (described below). In an alternate embodiment, the lamp 10 may only comprise an encapsulant material without an outer shell 18. The LED chip 12 may be supported, for example, by the lead frame 16, by the self supporting electrodes, the bottom of the shell 18, or by a pedestal (not shown) mounted to the shell or to the lead frame.

The structure of the illumination system includes a phosphor material 22 radiationally coupled to the LED chip 12. Radiationally coupled means that the elements are associated with each other so that at least part of the radiation emitted from one is transmitted to the other.

This phosphor material 22 is deposited on the LED 12 by any appropriate method. For example, a water-based suspension of the phosphor(s) can be formed, and applied as a phosphor layer to the LED surface. In one such method, a silicone, epoxy or other matrix material is used to create a slurry in which the phosphor particles are randomly suspended and placed around the LED. This method is merely exemplary of possible positions of the phosphor material 22 and LED 12. Thus, the phosphor material 22 may be coated over or directly on the light emitting surface of the LED chip 12 by coating and drying the phosphor suspension over the LED chip 12. Both the shell 18 and the encapsulant 20 should be transparent to allow light 24 to be transmitted through those elements. Although not intended to be limiting, in one embodiment, the median particle size of the phosphor material may be from about 1 to about 10 microns.

FIG. 2 illustrates a second preferred structure of the system according to the preferred aspect of the present invention. Corresponding numbers from FIGS. 1-4 (e.g. 12 in FIG. 1 and 112 in FIG. 2) relate to corresponding structures in each of the figures unless otherwise stated. The structure of the embodiment of FIG. 2 is similar to that of FIG. 1, except that the phosphor material 122 is interspersed within the encapsulant material 120, instead of being formed directly on the LED chip 112. The phosphor material (in the form of a powder) may be interspersed within a single region of the encapsulant material 120 or, more preferably, throughout the entire volume of the encapsulant material. Radiation 126 emitted by the LED chip 112 mixes with the light emitted by the phosphor material 122, and the mixed light appears as white light 124. If the phosphor is to be interspersed within the encapsulant material 120, then a phosphor powder may be added to a polymer precursor, loaded around the LED chip 112, and then the polymer precursor may be cured to solidify the polymer material. Other known phosphor interspersion methods may also be used, such as transfer molding.

Figure 3:
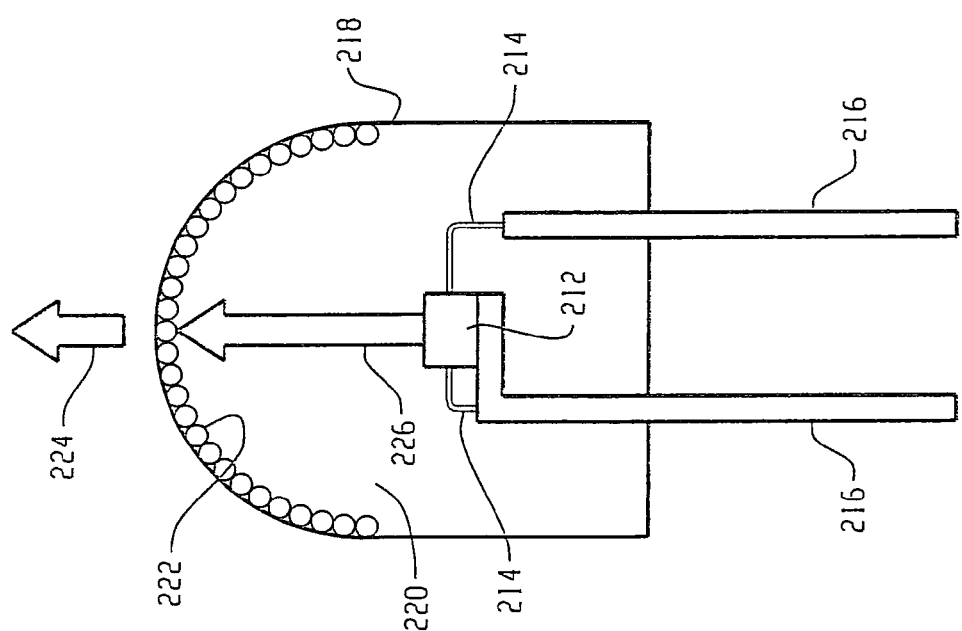
FIG. 3 is a schematic cross-sectional view of an illumination system in accordance with a third embodiment of the present invention.

FIG. 3 illustrates a third preferred structure of the system according to the preferred aspects of the present invention. The structure of the embodiment shown in FIG. 3 is similar to that of FIG. 1, except that the phosphor material 222 is coated onto a surface of the shell 218, instead of being formed over the LED chip 212. The phosphor material is preferably coated on the inside surface of the shell 218, although the phosphor may be coated on the outside surface of the shell, if desired. The phosphor material 222 may be coated on the entire surface of the shell or only a top portion of the surface of the shell. The radiation 226 emitted by the LED chip 212 mixes with the light emitted by the phosphor material 222, and the mixed light appears as white light 224. Of course, the structures of FIGS. 1-3 may be combined and the phosphor may be located in any two or all three locations or in any other suitable location, such as separately from the shell or integrated into the LED.

In any of the above structures, the lamp 10 may also include a plurality of scattering particles (not shown), which are embedded in the encapsulant material. The scattering particles may comprise, for example, $Al_2O_3$ particles (such as alumina powder) or $TiO_2$ particles. The scattering particles effectively scatter the coherent light emitted from the LED chip, preferably with a negligible amount of absorption.

As shown in a fourth preferred structure in FIG. 4, the LED chip 412 may be mounted in a reflective cup 430. The cup 430 may be made from or coated with a reflective material, such as alumina, titania, or other dielectric powder known in the art. A preferred reflective material is $Al_2O_3$. The remainder of the structure of the embodiment of FIG. 4 is the same as that of any of the previous Figures, and includes two leads 416, a conducting wire 432 electrically connecting the LED chip 412 with the second lead, and an encapsulant material 420.

Figure 5:
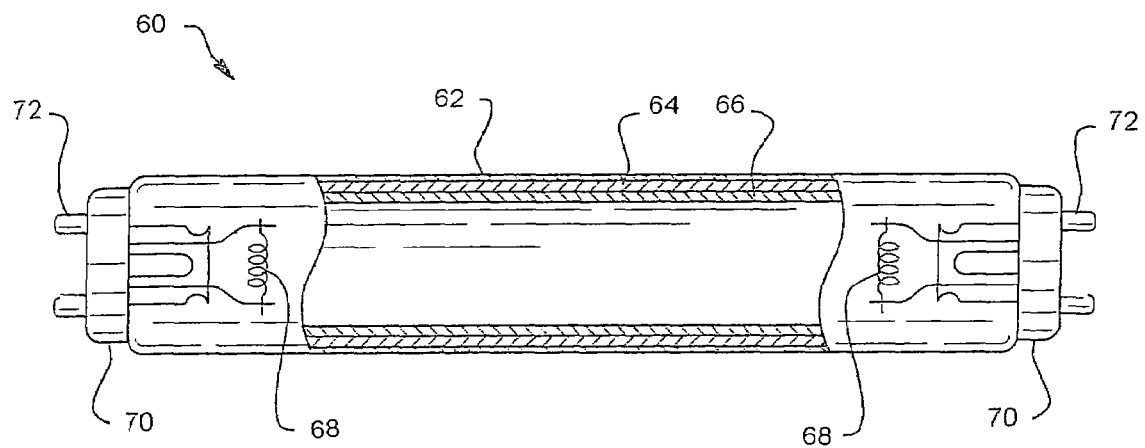
FIG. 5 is a schematic cross-section of a fluorescent lamp.

The present phosphor compositions may also be used in Hg and metal halide (such as halides of Zn and Ga) discharge lamps. Thus, with reference to FIG. 5, there is depicted a representative fluorescent lamp 10 comprising an elongated soda-lime silicate glass envelope 12 having a circular cross-section. The low pressure mercury discharge assembly in said lamp includes a pair of spaced conventional electrode structures 18 at each end connected to electrical contacts 22 of a base 20 fixed at both ends of the sealed glass envelope. The discharge-sustaining filling in said sealed glass envelope is an inert gas such as argon or a mixture of argon and other rare earth gases at a low pressure in combination with a small quantity of mercury to provide the low vapor pressure manner of lamp operation. Deposited on the inner surface of the glass envelope is a phosphor layer 14 comprising one or more phosphor compositions as described herein below. In one embodiment of the invention, the lamp 10 may have a second layer of material 14 positioned between the phosphor layer 16 and the inner surface of the glass envelope 12. This second layer can be an ultraviolet reflecting barrier layer as is known in the art. Such a barrier layer can comprise, for example, a mixture of alpha- and gamma-alumina particles.

Figure 7:
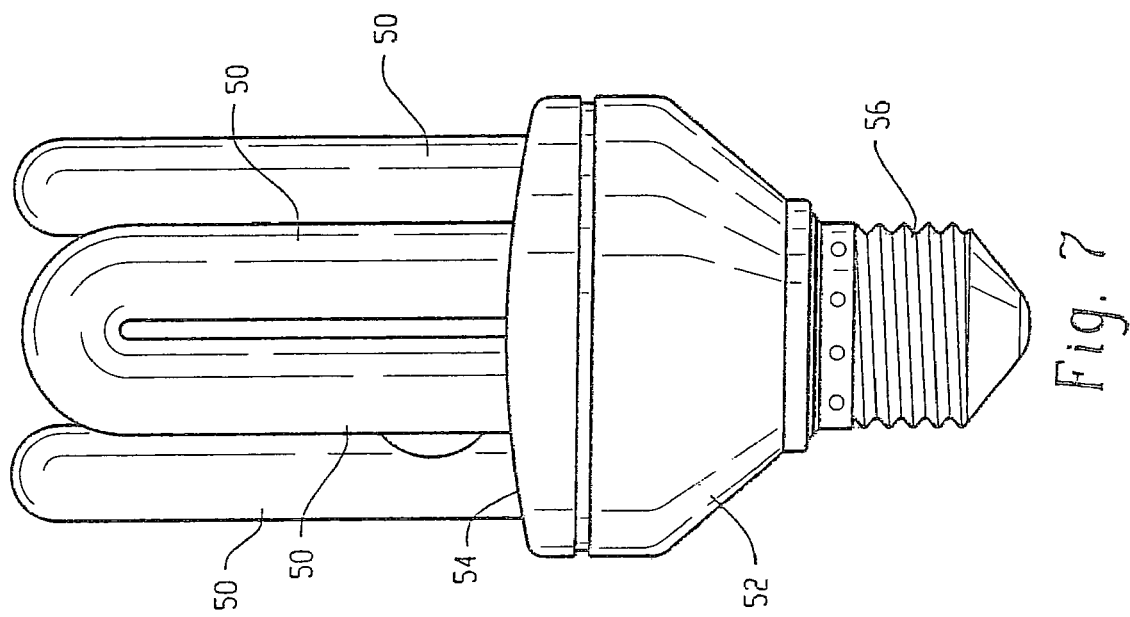
FIG. 7 is a cross-section of an alternate compact fluorescent lamp according to another embodiment of the present invention.
Figure 6:
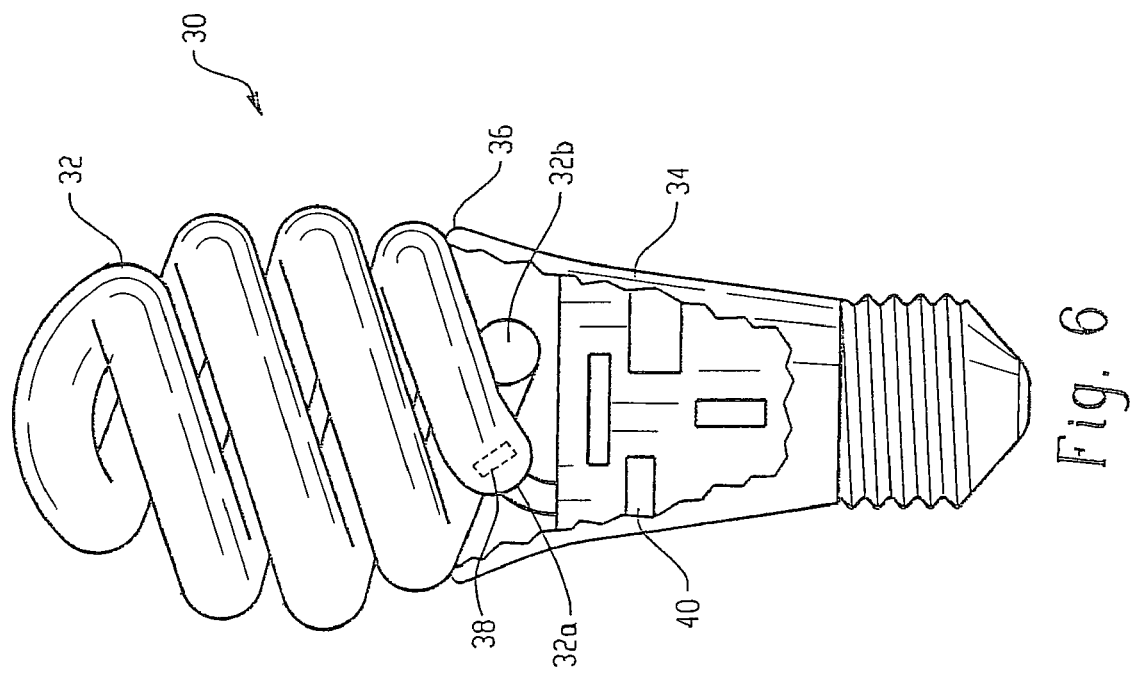
FIG. 6 is a cross-section of a compact fluorescent lamp according to an embodiment of the present invention.

The phosphors may also find use in compact fluorescent lamps. Thus, as can be seen in FIGS. 6 and 7, the phosphor materials of the present invention can be used in a compact fluorescent lamp arrangement. With reference to FIG. 6, a helical compact fluorescent lamp 30 is shown, having a lamp envelope or tube 32 in a coiled double helix configuration. End portions 32a, 32b enter the top portion 36 of the housing member 34; disposed within the end portions 32a, 32b are electrodes 38 which are electrically coupled to a ballast circuit arrangement 40 mounted within housing member 34. With respect to FIG. 7, a compact fluorescent lamp having a fluorescent tube 50, a housing 52 closed by a cap 54 and, according to the example, a screw base 56 is seen in side view. The compact fluorescent lamp is connected electrically to the mains through the base known in the art, and wires coming from the connection portions of the base are connected to a ballast circuit arranged inside the housing 52 and/or to electrodes of the fluorescent tube 50.

The above illustrated phosphor layer coatings in discharge lamps can be formed by various already known procedures including deposition from liquid suspensions and electrostatic deposition. For example, the phosphor can be deposited on the glass surface from a conventional aqueous suspension including various organic binders and adhesion promoting agents. Said aqueous suspension is applied and then dried in the conventional manner.

In one embodiment, the invention provides a novel phosphor composition, which may be used in the phosphor material 22 in the above described LED light, having the general formula $Eu_eM_mA_aG_gQ_qN_nX_x$, where M is at least one of Be, Mg, Ca, Sr, Ba, Cd, Sn, Pb or Zn; A is at least one of B, Al, Ga, In, Bi, Sc, Y, La or a rare earth element other than Eu; G is at least one of Si or Ge; Q is at least one of O, S, and Se; X is at least one of F, Cl, Br and I; $0<e<2$, $0<m<2$, $0\leq a<1$, $0<g<1$, $0<q<4$, $0<n<2$, $0\leq x<2$, and $2e+2m+3a+4g=2q+3n+x$. As used herein with respect to the above described phosphor, Eu is meant to denote the $Eu^{2+}$ ion. The amount of Eu doping in the phosphor (given by the stoichiometric coefficient e) will preferably range from about 0.005 to 0.5.

This off-stoichoimetric phosphor (wherein g<1) shows an improvement in quantum efficiency compared to $(Ca,Ba,Sr)_2SiO_4$:Eu (where g=1). The presence of M, A, N, Q and X in the composition also enhances the QE while allowing the customization of emission color by varying the identities and amounts of M, A, N, Q and X. For example, the introduction of nitrogen as $N^{3-}$ was discovered to produce a red shift. Similarly, Ba containing nitrido and halonitrodosilicates according to the present phosphor, show a red shift of as much as 50 nm in the main emission peak compared to Ba$_2$SiO$_4$:Eu. Thus, it is possible to tune the emission characteristics of the phosphor by varying the amounts and identities of the ions in the phosphor structure.

When used with an LED emitting at from 200 to 500 nm and optionally with one or more additional phosphors, the resulting lighting system may produce a light having a white color, the characteristics of which will be discussed in more detail below.

The above described phosphor compositions may be produced using known solution or solid state reaction processes for the production of phosphors by combining, for example, elemental oxides, carbonates and/or hydroxides as starting materials. Other starting materials may include nitrates, chlorides, sulfates, acetates, citrates, or oxalates. Alternately, coprecipitates of the rare earth oxides could be used as the starting materials for the RE elements. In a typical process, the starting materials are combined via a dry or wet blending process and fired in air or under a reducing atmosphere or in ammonia at from, e.g., 1000 to 1600° C.

A fluxing agent may be added to the mixture before or during the step of mixing. This fluxing agent may be NH$_4$Cl or any other conventional fluxing agent, such as CaF$_2$, boric acid, borates, and the like. A quantity of a fluxing agent of less than about 20, preferably less than about 5, percent by weight of the total weight of the mixture is adequate for fluxing purposes. When using fluxes, some of their ions can be incorporated into the phosphor material and become part of its formula.

The starting materials may be mixed together by any mechanical method including, but not limited to, stirring or blending in a high-speed blender or a ribbon blender. The starting materials may be combined and pulverized together in a bowl mill, a hammer mill, or a jet mill. The mixing may be carried out by wet milling especially when the mixture of the starting materials is to be made into a solution for subsequent precipitation. If the mixture is wet, it may be dried first before being fired under a reducing atmosphere at a temperature from about 900° C. to about 1700° C., more preferably from 1100° C. to 1400° C., for a time sufficient to convert all of the mixture to the final composition.

The firing may be conducted in a batchwise or continuous process, preferably with a stirring or mixing action to promote good gas-solid contact. The firing time depends on the quantity of the mixture to be fired, the rate of gas conducted through the firing equipment, and the quality of the gas-solid contact in the firing equipment. The reducing atmosphere typically comprises a reducing gas such as hydrogen, carbon monoxide, ammonia or a combination thereof, optionally diluted with an inert gas, such as nitrogen, argon, etc., or a combination thereof. Alternatively, the crucible containing the mixture may be packed in a second closed crucible containing high-purity carbon particles and fired in air so that the carbon particles react with the oxygen present in air, thereby, generating carbon monoxide for providing a reducing atmosphere.

These compounds may be blended and dissolved in a nitric acid solution. The strength of the acid solution is chosen to rapidly dissolve the oxygen-containing compounds and the choice is within the knowledge of a person skilled in the art. Ammonium hydroxide is then added in increments to the acidic solution. An organic base such as methylamine, ethylamine, dimethylamine, trimethylamine, or the like may be used in place of ammonium hydroxide.

The precipitate is typically filtered, washed with deionized water, and dried. The dried precipitate is ball milled or otherwise thoroughly blended and then calcined in air at about 400° C. to about 1600° C. for a sufficient time to ensure a substantially complete transformation of the starting material. The calcination may be carried out at a constant temperature. Alternatively, the calcination temperature may be ramped from ambient to and held at the final temperature for the duration of the calcination. The calcined material is similarly fired at 1000-1600° C. for a sufficient time under a reducing atmosphere such as H$_2$, CO, or a mixture of one of these gases with an inert gas, or an atmosphere generated by a reaction between charcoal and the products of the decomposition of the starting materials or using ammonia gas to covert all of the calcined material to the desired phosphor composition.

Alternatively, a sol-gel synthesis may also be used to produce the phosphors of the present invention. Thus, in an exemplary process, a phosphor for use in the present invention can be made by first combining predetermined amounts of appropriate oxide compounds and wetting them with water. Dilute nitric acid is then added to dissolve the oxide and carbonates. The solution is then dried to remove excess nitric acid and then dissolved in absolute ethanol. In a second container, a predetermined amount of tetraethyl orthosilicate (TEOS) is dissolved in absolute ethanol. The contents of the two containers are then combined and stirred under heat until gelling occurs. The gel is subsequently heated in an oven to remove organics, ground to a powder, and then calcined at 800-1200° C. Finally, the powder may be ground again and further calcined in reducing atmosphere at 1100-1400° C. for 4 to 10 hours. Similar procedures can be used for the other described phosphors.

The resulting phosphor particles may preferably have median diameters ($d_{50}$) ranging from 2-30 μm, as determined by light scattering analysis (Horiba LA-920).

While suitable for use alone with a blue or UV LED chip, the above phosphor compositions may be blended with one or more additional phosphors for use in white LED light sources. Thus, in another embodiment, an LED lighting assembly is provided including a phosphor composition comprising a blend of a phosphor from one of the above embodiments with one or more additional phosphors.

Thus, in another embodiment, there is provided a white light emitting device including a UV emitting LED chip emitting at from about 200 to about 500 nm and a phosphor blend including the above described $Eu_eM_mA_aG_gQ_qN_nX_x$ phosphor, and one or more additional phosphors, preferably at least a blue and a green phosphor. The relative amounts of each phosphor in the phosphor blend can be described in terms of spectral weight. The spectral weight is the relative amount that each phosphor contributes to the overall emission spectra of the phosphor blend. The spectral weight amounts of all the individual phosphors should add up to 1. In a preferred embodiment, each of the phosphors in the blend will have a spectral weight ranging from about 0.01 to 0.8.

Figure 8:
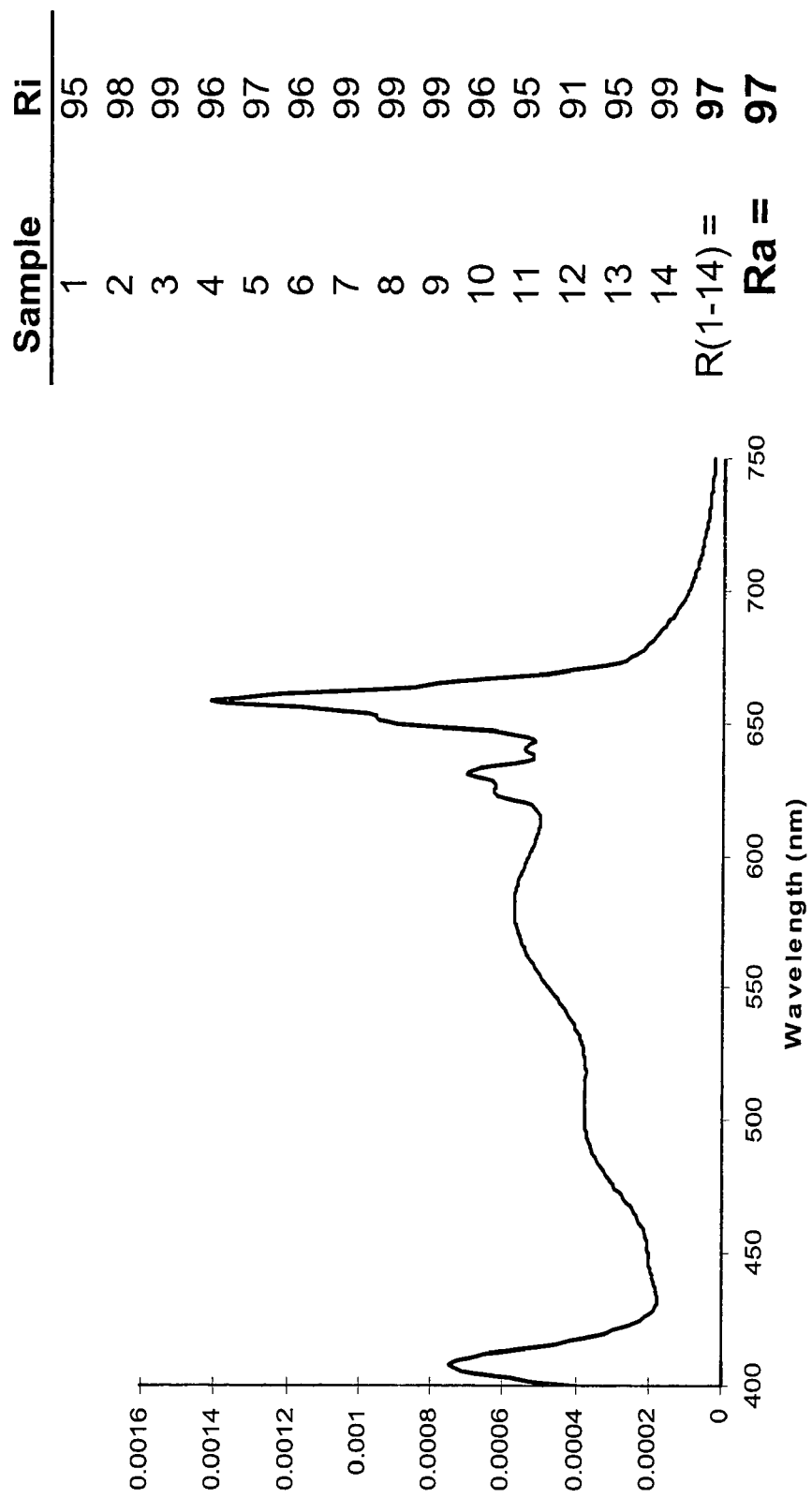
FIG. 8 is a spectrum of a lighting apparatus according to another embodiment of the present invention.

In one lighting source, there is provided a white light emitting device including a UV emitting LED chip emitting at from about 200 to about 500 nm and a phosphor blend including the above described $Eu_eM_mA_aG_gQ_qN_nX_x$ phosphor, and one or more of (Ba,Sr,Ca)$_5$(PO$_4$)$_3$Cl:Eu$^{2+}$ ("SECA"), Sr$_4$Al$_{14}$O$_{25}$:Eu$^{2+}$ ("SAE"), and 3.5MgO*0.5MgF$_2$*GeO$_2$:Mn$^{4+}$ ("MFG"). In a particularly preferred embodiment, each of the above described phosphors, when present in the blend, will have a spectral weight ranging from about 0.01 to 0.8. FIG. 8 shows a calculated model of the spectrum of a source according to this embodiment, having a color point on the blackbody locus, a CCT of 3500K, a general CRI ($R_a$) of 97, a mean CRI ($R_{1-14}$) of 97, and an $R_9$ value of 99. Other CCT and CRI combinations are also achievable by using various ratios between the phosphors. Thus, exemplary lighting apparatuses may be produced having CRI ($R_a$) values greater than 90 and CCT values <4500 K.

In addition, other phosphors such as green, blue, orange, or other color phosphors may be used in the blend to customize the white color of the resulting light and produce sources with improved light quality. While not intended to be limiting, suitable phosphors for use in the blend with the present invention phosphors include:

$(Ba,Sr,Ca)_5(PO_4)_3(Cl,F,Br,OH): Sb^{3+}, Mn^{2+}$
$(Ba,Sr,Ca)_5(PO_4)_3(Cl,F,Br,OH): Eu^{2+}, Mn^{2+}$
$(Ba,Sr,Ca)BPO_5:Eu^{2+}, Mn^{2+}$
$(Sr,Ca)_{10}(PO_4)_6*nB_2O_3:Eu^{2+}$
$Sr_2Si_3O_8*2SrCl_2:Eu^{2+}$
$Ba_3MgSi_2O_8:Eu^{2+}$
$BaAl_8O_{13}:Eu^{2+}$
$2SrO*0.84P_2O_5*0.16B_2O_3:Eu^{2+}$;
$(Ba,Sr,Ca)MgAl_{10}O_{17}:Eu^{2+}, Mn^{2+}$
$(Ba,Sr,Ca)Al_2O_4:Eu^{2+}$
$(Y,Gd,Lu,Sc,La)BO_3:Ce^{3+},Tb^{3+}$
$Ca_8Mg(SiO_4)_4Cl_2:Eu^{2+},Mn^{2+}$
$(Ba,Sr,Ca)_2SiO_4:Eu^{2+}$
$(Ba,Sr,Ca)_2(Mg,Zn)Si_2O_7:Eu^{2+}$
$(Sr,Ca,Ba)(Al,Ga,In)_2S_4:Eu^{2+}$
$(Y,Gd,Tb,La,Sm,Pr,Lu)_3(Al,Ga)_5O_{12}:Ce^{3+}$
$(Ca,Sr)_8(Mg,Zn)(SiO_4)_4Cl_2:Eu^{2+}, Mn^{2+}$
$Na_2Gd_2B_2O_7:Ce^{3+}, Tb^{3+}$
$(Ba,Sr)_2(Ca,Mg,Zn)B_2O_6:K,Ce,Tb$
$(Sr,Ca,Ba,Mg,Zn)_2P_2O_7:Eu^{2+}, Mn^{2+}$
$(Ca,Sr,Ba,Mg, Zn)_{10}(PO_4)_6(F,Cl,Br,OH)_2:Eu^{2+},Mn^{2+}$
$(Gd,Y,Lu,La)_2O_3:Eu^{3+},Bi^{3+}$
$(Gd,Y,Lu,La)_2O_2S:Eu^{3+},Bi^{3+}$
$(Gd,Y,Lu,La)VO_4:Eu^{3+},Bi^{3+}$
$(Ca,Sr)S:Eu^{2+}$
$SrY_2S_4:Eu^{2+}$
$CaLa_2S_4:Ce^{3+}$
$(Ca,Sr)S:Eu^{2+}$
$(Ba,Sr,Ca)MgP_2O_7:Eu^{2+},Mn^{2+}$
$(Y,Lu)_2WO_6:Eu^{3+}, Mo^{6+}$
$(Ba,Sr,Ca)_xSi_yN_z:Eu^{2+}$

When the phosphor composition includes a blend of two or more phosphors, the ratio of each of the individual phosphors in the phosphor blend may vary depending on the characteristics of the desired light output. The relative proportions of the individual phosphors in the various embodiment phosphor blends may be adjusted such that when their emissions are blended and employed in an lighting device, there is produced visible light of predetermined x and y values on the CIE chromaticity diagram. As stated, a white light is preferably produced. This white light may, for instance, may possess an x value in the range of about 0.30 to about 0.55, and a y value in the range of about 0.30 to about 0.55. As stated, however, the exact identity and amounts of each phosphor in the phosphor composition can be varied according to the needs of the end user.

It may be desirable to add pigments or filters to the phosphor composition. When the LED is a UV emitting LED, the phosphor layer 22 may also comprise from 0 up to about 10% by weight (based on the total weight of the phosphors) of a pigment or other UV absorbent material capable of absorbing or reflecting UV radiation having a wavelength between 200 nm and 450 nm.

Suitable pigments or filters include any of those known in the art that are capable of absorbing radiation generated between 200 nm and 450 nm. Such pigments include, for example, nickel titanate or praseodymium zirconate. The pigment may be used in an amount effective to filter 10% to 100% of the radiation generated in the 200 nm to 500 nm range.

EXAMPLES

In a set of trials, various phosphors were prepared having differing formulations. In order to achieve accurate formulation, the loss on ignition (LOI) was determined for the raw materials (For $SrCO_3$ & $CaCO_3$ the LOI was determined at 500° C., for silicic acid at 900° C., and for $Eu_2O_3$ at 1150° C.). It will be clear to one skilled in the art that LOI values may vary between supplied lots of any given material and always need to be determined experimentally, such that proper adjustments can be made to the formulation. The results of this LOI determination are listed below in Table 1.

TABLE 1

| Raw Material | LOI |
| --- | --- |
| $SrCO_3$ (99.99% purity, Aldrich) | 0.39% |
| $CaCO_3$ (99.999% purity, Aldrich) | 0.11% |
| $Eu_2O_3$ (99.99% purity, PIDC) | 1.52% |
| Silicic acid (99.9% purity, City Chemicals) | 19.61% |

$Sr_{1.66}Ca_{0.3}Eu_{0.04}Si_{0.96}O_{3.92}$ phosphor: The following amounts: 103.331 g of $SrCO_3$, 12.625 g of $CaCO_3$, 3.002 g of $Eu_2O_3$, 30.140 g of silicic acid and 0.746 g of $NH_4Cl$ flux were weighed out, based on the target formula and the LOI data from Table 1. After adequate blending, the powders were loaded into an alumina boat and fired at 1300° C., 6 h in 1% $H_2/N_2$ (flow rate 50 standard liters per hour; heating and cooling rate 200° C./h). Upon completion of firing, the yellow cake was milled to a $d_{50}$ value of 15 microns. The color coordinates (x and y), quantum efficiency (QE) and absorbance (Abs) were determined using phosphor powders pressed into plaques. The QE is a relative measurement versus a standard LED phosphor $Ca_5(PO_4)_3Cl:Eu^{2+}, Mn^{2+}$ set at 100%. The absorbance is calculated from reflectance measurements calibrated with a pressed powder plaque of $BaSO_4$, as customary in the art. The relative QE/Abs of the sample under 405 nm excitation was 80%/80% with color coordinates (x, y) of (0.468, 0.488).

$Sr_{1.68}Ca_{0.3}Eu_{0.02}Si_{0.96}O_{3.92}$ phosphor: The following amounts: 104.576 g of $SrCO_3$, 12.625 g of $CaCO_3$, 1.501 g of $Eu_2O_3$, 30.140 g of silicic acid and 0.744 g of $NH_4Cl$ were weighed out and processed further as in the previous example. The relative QE/Abs of this sample under 405 nm excitation was 87%/76% with color coordinates (x, y) of (0.461, 0.489).

The results for additional similar trials are set forth in table 2.

TABLE 2

| Phosphor Composition | Calcination Temp (° C.) | QE | x | y | Abs |
| --- | --- | --- | --- | --- | --- |
| $Sr_{1.56}Ca_{0.40}Eu_{0.04}SiO_4$ | 1200 | 49 | 0.459 | 0.450 | 71 |
| $Sr_{1.56}Ca_{0.40}Eu_{0.04}Si_{0.96}O_{3.92}$ | 1200 | 79 | 0.479 | 0.474 | 78 |
| $Sr_{1.58}Ca_{0.40}Eu_{0.02}Si_{0.88}O_{3.76}$ | 1200 | 119 | 0.459 | 0.470 | 43 |
| $Sr_{1.58}Ca_{0.40}Eu_{0.02}Si_{0.92}O_{3.84}$ | 1200 | 103 | 0.465 | 0.469 | 54 |
| $Sr_{1.58}Ca_{0.40}EU_{0.02}Si_{0.96}O_{3.92}$ | 1200 | 85 | 0.469 | 0.469 | 63 |
| $Sr_{1.58}Ca_{0.40}Eu_{0.02}SiO_4$ | 1200 | 57 | 0.470 | 0.418 | 58 |
| $Sr_{1.58}Ca_{0.40}Eu_{0.02}Si_{1.04}O_{4.08}$ | 1200 | 71 | 0.500 | 0.372 | 43 |
| $Sr_{1.58}Ca_{0.40}Eu_{0.02}Si_{0.88}O_{3.76}$ | 1400 | 86 | 0.482 | 0.469 | 64 |
| $Sr_{1.58}Ca_{0.40}Eu_{0.02}Si_{0.92}O_{3.84}$ | 1400 | 92 | 0.478 | 0.475 | 65 |
| $Sr_{1.58}Ca_{0.40}Eu_{0.02}Si_{0.96}O_{3.92}$ | 1400 | 88 | 0.481 | 0.475 | 70 |
| $Sr_{1.58}Ca_{0.40}Eu_{0.02}SiO_4$ | 1400 | 58 | 0.473 | 0.411 | 54 |
| $Sr_{1.58}Ca_{0.40}Eu_{0.02}Si_{1.04}O_{4.08}$ | 1400 | 46 | 0.482 | 0.402 | 66 |

It was discovered that beneficial results (i.e. best combination of high QE and Abs) were obtained with samples that were deficient in Si (g<1, e.g. g=0.96), regardless of the calcination temperature.

Based on the above trials and experiments conducted by the inventors, it was discovered that exemplary phosphors having excellent combination of properties are given by general composition $Sr_{2-u-e}Ca_uEu_eSi_{1-x}O_{4-2x}$ where $0.25 \leq u \leq 0.50$, $0.01 \leq e \leq 0.06$ and $0.02 \leq x \leq 0.20$, with some particularly preferred examples being $Sr_{1.73}Ca_{0.25}Eu_{0.02}Si_{0.92}O_{3.84}$, $Sr_{1.68}Ca_{0.30}Eu_{0.02}Si_{0.92}O_{3.84}$, $Sr_{1.66}Ca_{0.30}Eu_{0.04}Si_{0.96}O_{3.92}$, and $Sr_{1.56}Ca_{0.40}Eu_{0.04}Si_{0.96}O_{3.92}$.

The present development has been described with reference to various exemplary embodiments. Modifications and alteration will occur to others upon a reading and understanding of this specification. The invention is intended to include all such modifications and alterations insofar as they come within the scope of the appended claims or the equivalent thereof.

What is claimed is:

1. A lighting apparatus for emitting light comprising:
    a light source emitting radiation having a peak emission from about 200 nm to about 500 nm; and
    a phosphor material radiationally coupled to the light source, the phosphor material comprising $Eu_eM_mA_aG_gQ_qN_nX_x$, where M is at least one of Be, Ca, Sr, Ba, Cd, Sn, Pb or Zn; A is at least one of B, Ga, In, Bi, Sc, Y, La or a rare earth element other than Eu; G is at least one of Si or Ge; Q is at least one of O, S, and Se; X is at least one of F, Cl, Br and I; $0<e<2$, $0<m<2$, $0 \leq a<1$, $0<g<1$, $0<q<4$, $0 \leq n<2$, $0 \leq x<2$, and $2e+2m+3a+4g=2q+3n+x$.

2. The lighting apparatus according to claim 1, wherein the light source is an LED.

3. The lighting apparatus according to claim 2, wherein the LED comprises a nitride compound semiconductor represented by the formula $In_iGa_jAl_kN$, where $0 \leq i$; $0 \leq j$, $0 \leq K$, and $i+j+k=1$.

4. The lighting apparatus according to claim 1, wherein the light source is an organic emissive structure.

5. The lighting apparatus according to claim 1, wherein the phosphor material is coated on a surface of the light source.

6. The lighting apparatus according to claim 1, further comprising an encapsulant surrounding the light source and the phosphor material.

7. The lighting apparatus according to claim 1, wherein the phosphor material is dispersed in the encapsulant.

8. The lighting apparatus according to claim 1, further comprising a reflector cup.

9. The lighting apparatus according to claim 1, wherein the lighting apparatus comprises a discharge lamp and wherein said phosphor material is coated on a surface of a glass envelope.

10. The lighting apparatus according to claim 1, wherein said phosphor material further comprises one or more additional phosphors.

11. The lighting apparatus according to claim 10, wherein said one or more additional phosphors are selected from the group of $(Ba,Sr,Ca)_5(PO_4)_3Cl:Eu^{2+}$, $Sr_4Al_{14}O_{25}:Eu^{2+}$, $3.5MgO*0.5MgF_2*GeO_2:Mn^{4+}$, $(Ba,Sr,Ca)_5(PO_4)_3(Cl,F,Br,OH):Sb^{3+}$, $Mn^{2+}$; $(Ba,Sr,Ca)_5(PO_4)_3(Cl,F,Br,OH):Eu^{2+}$, $Mn^{2+}$, $(Ba,Sr,Ca)BPO_5:Eu^{2+},Mn^{2+}$; $(Sr,Ca)_{10}(PO_4)_6*nB_2O_3:Eu^{2+}$; $Sr_2Si_3O_8*2SrCl_2:Eu^{2+}$; $Ba_3MgSi_2O_8:Eu^{2+}$; $BaAl_8O_{13}:Eu^{2+}$; $2SrO*0.84P_2O_5*0.16B_2O_3:Eu^{2+}$; $(Ba,Sr,Ca)MgAl_{10}O_{17}:Eu^{2+}$, $Mn^{2+}$; $(Ba,Sr,Ca)Al_2O_4:Eu^{2+}$; $(Y,Gd,Lu,Sc,La)BO_3:Ce^{3+},Tb^{3+}$; $Ca_8Mg(SiO_4)_4Cl_2:Eu^{2+}$, $Mn^{2+}$; $(Ba,Sr,Ca)_2SiO_4:Eu^{2+}$; $(Ba,Sr,Ca)_2(Mg,Zn)Si_2O_7:Eu^{2+}$; $(Sr,Ca,Ba)(Al,Ga,In)_2S_4:Eu^{2+}$; $(Y,Gd,Tb,La,Sm,Pr,Lu)_3(Al,Ga)_5O_{12}:Ce^{3+}$; $(Ca,Sr)_8(Mg,Zn)(SiO_4)_4Cl_2:Eu^{2+}$, $Mn^{2+}$; $Na_2Gd_2B_2O_7:Ce^{3+},Tb^{3+}$; $(Ba,Sr)_2(Ca,Mg,Zn)B_2O_6:K,Ce,Tb$; $(Sr,Ca,Ba,Mg,Zn)_2P_2O_7:Eu^{2+},Mn^{2+}$; $(Ca,Sr,Ba,Mg,Zn)_{10}(PO_4)_6(F,Cl,Br,OH)_2:Eu^{2+}$, $Mn^{2+}$; $(Gd,Y,Lu,La)_2O_3:Eu^{3+}$, $Bi^{3+}$; $(Gd,Y,Lu,La)_2O_2S:Eu^{3+},Bi^{3+}$; $(Gd,Y,Lu,La)VO_4:Eu^{3+}$, $Bi^{3+}$; $(Ca,Sr)S:Eu^{2+}$; $SrY_2S_4:Eu^{2+}$; $CaLa_2S_4:Ce^{3+}$; $(Ca,Sr)S:Eu^{2+}$; $(Ba,Sr,Ca)MgP_2O_7:Eu^{2+},Mn^{2+}$; $(Y,Lu)_2WO_6:Eu^{3+}$, $Mo^{6+}$; and $(Ba,Sr,Ca)_xSi_yN_z:Eu^{2+}$.

12. The lighting apparatus according to claim 11, wherein the phosphor material comprises $(Ba,Sr,Ca)_5(PO_4)_3Cl:Eu^{2+}$, $Sr_4Al_{14}O_{25}:Eu^{2+}$, and $3.5MgO*0.5MgF_2*GeO_2:Mn^{4+}$.

13. The lighting apparatus according to claim 10, wherein said phosphor material is capable of absorbing the radiation emitted by a light source having a peak emission from 200-500 nm and emitting radiation that, when combined with said radiation from said light source, produces white light.

14. The lighting apparatus according to claim 13, wherein said apparatus has a color temperature of <4500 K.

15. The lighting apparatus according to claim 13, wherein said apparatus has a general CRI ($R_a$) of 90 or greater.

16. The lighting apparatus according to claim 1, wherein said phosphor material comprises $Sr_{2-u-e}Ca_uEu_eSi_{1-x}O_{4-2x}$ where $0.25 \leq u \leq 0.50$, $0.01 \leq e \leq 0.06$ and $0.02 \leq x \leq 0.20$.

17. The lighting apparatus according to claim 16, wherein said phosphor material comprises one or more of the group including $Sr_{1.73}Ca_{0.25}Eu_{0.02}Si_{0.92}O_{3.84}$, $Sr_{1.68}Ca_{0.30}Eu_{0.02}Si_{0.92}O_{3.84}$, $Sr_{1.66}Ca_{0.30}Eu_{0.04}Si_{0.96}O_{3.92}$, and $Sr_{1.56}Ca_{0.40}Eu_{0.04}Si_{0.96}O_{3.92}$.

18. A phosphor blend comprising a first phosphor composition comprising $Eu_eM_mA_aG_gQ_qN_nX_x$, where M is at least one of Be, Ca, Sr, Ba, Cd, Sn, Pb or Zn; A is at least one of B, Ga, In, Bi, Sc, Y, La or a rare earth element other than Eu; G is at least one of Si or Ge; Q is at least one of O, S, and Se; X is at least one of F, Cl, Br and I; $0<e<2$, $0<m<2$, $0 \leq a<1$, $0<g<1$, $0<q<4$, $0 \leq n<2$, $0 \leq x<2$, and $2e+2m+3a+4g=2q+3n+x$; and at least one additional phosphor composition.

19. The phosphor blend according to claim 18, wherein said phosphor blend comprises one or more of the group including $(Ba,Sr,Ca)_5(PO_4)_3Cl:Eu^{2+}$, $Sr_4Al_{14}O_{25}:Eu^{2+}$, $3.5MgO*0.5MgF_2*GeO_2:Mn^{4+}$, $(Ba,Sr,Ca)_5(PO_4)_3(Cl,F,Br,OH):Sb^{3+}$, $Mn^{2+}$; $(Ba,Sr,Ca)_5(PO_4)_3(Cl,F,Br,OH):Eu^{2+}$, $Mn^{2+}$, $(Ba,Sr,Ca)BPO_5:Eu^{2+},Mn^{2+}$; $(Sr,Ca)_{10}(PO_4)_6*nB_2O_3:Eu^{2+}$; $Sr_2Si_3O_8*2SrCl_2:Eu^{2+}$; $Ba_3MgSi_2O_8:Eu^{2+}$; $BaAl_8O_{13}:Eu^{2+}$; $2SrO*0.84P_2O_5*0.16B_2O_3:Eu^{2+}$; $(Ba,Sr,Ca)MgAl_{10}O_{17}:Eu^{2+},Mn^{2+}$; $(Ba,Sr,Ca)Al_2O_4:Eu^{2+}$; $(Y,Gd,Lu,Sc,La)BO_3:Ce^{3+},Tb^{3+}$; $Ca_8Mg(SiO_4)_4Cl_2:Eu^{2+}$, $Mn^{2+}$; $(Ba,Sr,Ca)_2SiO_4:Eu^{2+}$; $(Ba,Sr,Ca)_2(Mg,Zn)Si_2O_7:Eu^{2+}$; $(Sr,Ca,Ba)(Al,Ga,In)_2S_4:Eu^{2+}$; $(Y,Gd,Tb,La,Sm,Pr,Lu)_3(Al,Ga)_5O_{12}:Ce^{3+}$; $(Ca,Sr)_8(Mg,Zn)(SiO_4)_4Cl_2:Eu^{2+}$, $Mn^{2+}$; $Na_2Gd_2B_2O_7:Ce^{3+},Tb^{3+}$; $(Ba,Sr)_2(Ca,Mg,Zn)B_2O_6:K,Ce,Tb$; $(Sr,Ca,Ba,Mg,Zn)_2P_2O_7:Eu^{2+},Mn^{2+}$; $(Ca,Sr,Ba,Mg,Zn)_{10}(PO_4)_6(F,Cl,Br,OH)_2:Eu^{2+}$, $Mn^{2+}$; $(Gd,Y,Lu,La)_2O_3:Eu^{3+}$, $Bi^{3+}$; $(Gd,Y,Lu,La)_2O_2S:Eu^{3+},Bi^{3+}$; $(Gd,Y,Lu,La)VO_4:Eu^{3+}$, $Bi^{3+}$; $(Ca,Sr)S:Eu^{2+}$; $SrY_2S_4:Eu^{2+}$; $CaLa_2S_4:Ce^{3+}$; $(Ca,Sr)S:Eu^{2+}$; $(Ba,Sr,Ca)MgP_2O_7:Eu^{2+}$, $Mn^{2+}$; $(Y,Lu)_2WO_6:Eu^{3+},Mo^{6+}$; and $(Ba,Sr,Ca)_xSi_yN_z:Eu^{2+}$.

20. The phosphor blend according to claim 18, wherein said phosphor blend comprises $Sr_{2-u-v}Ca_uEu_eSi_{1-x}O_{4-2x}$ where $0.25 \leq u \leq 0.40$, $0.01 \leq e \leq 0.06$ and $0.02 \leq x \leq 0.20$.

21. The phosphor blend according to claim 20, wherein said phosphor blend comprises one or more of the group including Sr$_{1.73}$Ca$_{0.25}$Eu$_{0.02}$Si$_{0.92}$O$_{3.84}$, Sr$_{1.68}$Ca$_{0.30}$Eu$_{0.02}$Si$_{0.92}$O$_{3.84}$, Sr$_{1.66}$Ca$_{0.30}$Eu$_{0.04}$Si$_{0.96}$O$_{3.92}$, and Sr$_{1.56}$Ca$_{0.40}$Eu$_{0.04}$Si$_{0.96}$O$_{3.92}$.

22. A phosphor material comprising Eu$_e$M$_m$A$_a$G$_g$Q$_q$N$_n$X$_x$, where M is at least one of Be, Ca, Sr, Ba, Cd, Sn, Pb or Zn; A is at least one of B, Ga, In, Bi, Sc, Y, La or a rare earth element other than Eu; G is at least one of Si or Ge; Q is at least one of O, S, and Se; X is at least one of F, Cl, Br and I; $0<e<2$, $0<m<2$, $0\leq a<1$, $0<g<1$, $0<q<4$, $0\leq n<2$, $0\leq x<2$, and $2e+2m+3a+4g=2q+3n+x$.

23. The phosphor material according to claim 22, wherein said phosphor material comprises Sr$_{2-u-e}$Ca$_u$Eu$_e$Si$_{1-x}$O$_{4-2x}$ where $0.25\leq u\leq 0.50$, $0.01\leq e\leq 0.06$ and $0.02\leq x\leq 0.20$.

24. The phosphor material according to claim 23, wherein said phosphor material comprises one or more of the group including: Sr$_{1.73}$Ca$_{0.25}$Eu$_{0.02}$Si$_{0.92}$O$_{3.84}$, Sr$_{1.68}$Ca$_{0.30}$Eu$_{0.02}$Si$_{0.92}$O$_{3.84}$, Sr$_{1.66}$Ca$_{0.30}$Eu$_{0.04}$Si$_{0.96}$O$_{3.92}$, and Sr$_{1.56}$Ca$_{0.40}$Eu$_{0.04}$Si$_{0.96}$O$_{3.92}$.

* * * * *